INFRARED SPECTRUM OF DIUMYCIN A' SODIUM SALT

INFRARED SPECTRUM OF DIUMYCIN B' SODIUM SALT

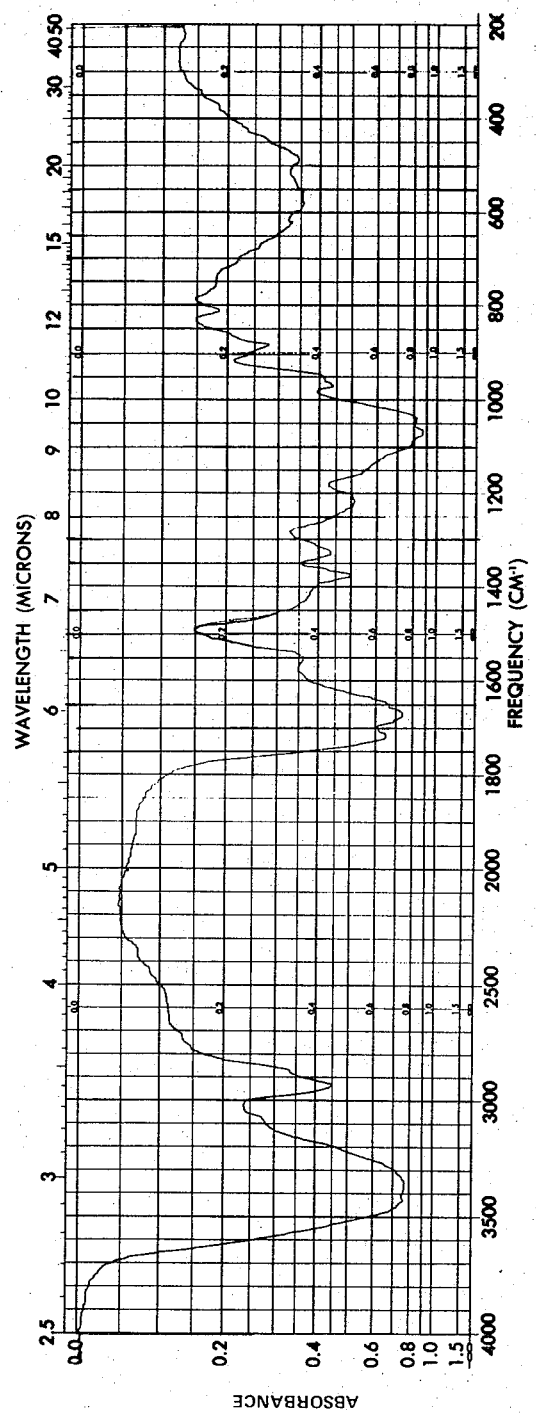

# 3,830,936
DIUMYCIN A' AND B' AND SALTS THEREOF

William A. Slusarchyk, Belle Mead, and Frank Lee Weisenborn, Titusville, N.J., assignors to E. R. Squibb & Sons, Inc., Princeton, N.J.
Continuation-in-part of abandoned application Ser. No. 198,826, Nov. 15, 1971. This application July 24, 1972, Ser. No. 274,361
Int. Cl. A61k 21/00
U.S. Cl. 424—116                   5 Claims

ABSTRACT OF THE DISCLOSURE

Diumycin A' and diumycin B', new chemical compounds, are provided, which are useful as antibiotics, and are prepared employing the same procedure as disclosed in U.S. Pat. No. 3,496,268. Diumycin A' and diumycin B' possess antibacterial activity against gram-positive bacteria.

---

Figure 1:
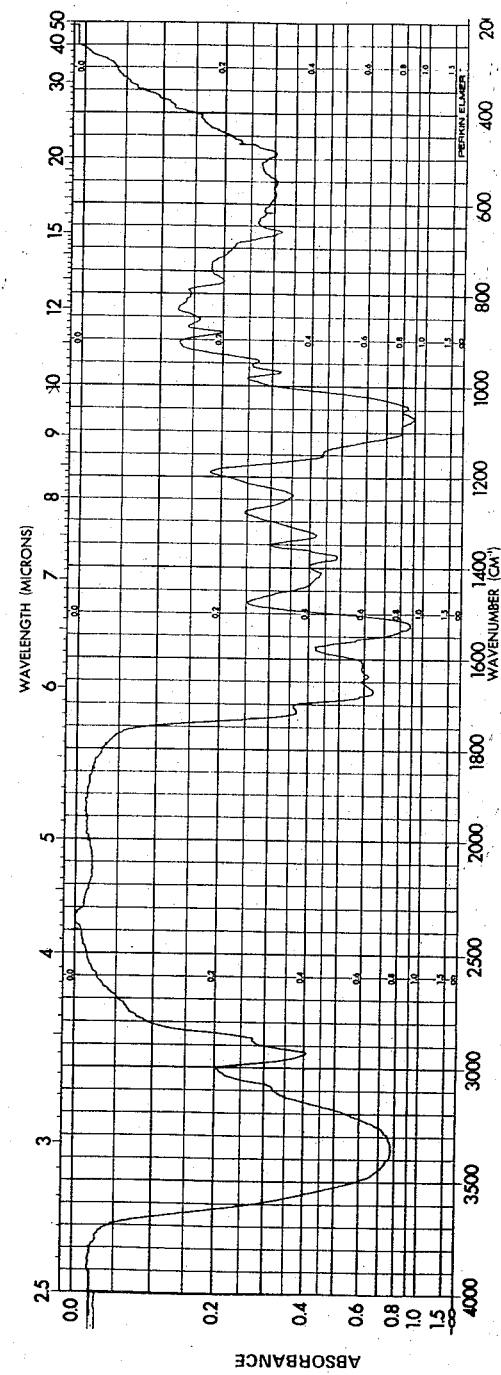

This application is a continuation-in-part of application Ser. No. 198,826, filed Nov. 15, 1971, now abandoned.

This invention relates to new chemical compounds and more particularly to diumcin A' and diumycin B' and salts thereof with bases.

In U.S. Pat. No. 3,496,268, issued Feb. 17, 1970, there is described a process for preparing two new groups of antibiotics, named therein as umbrinomycin and its components umbrinomycin A and umbrinomycin B and diumycin and its components diumycin A and diumycin B. These antibiotics are formed as follows:

Streptomyces umbrinus is grown at 25° C. under submerged areobic conditions in an aqueous nutrient medium containing an assimilable carbohydrate and nitrogen source. The fermentation is carried out for approximately 168 hours, at the end of which time the antibiotics have been formed.

After the fermentation is completed, the broth is adjusted to a pH of about 3 and filtered after addition of filter aid. The antibiotics are extracted from the mycelium (i.e., filter cake) with methanol. The methanolic extract is adjusted to a pH of about 6 to 8 and concentrated in vacuo, leaving an aqueous suspension.

To recover only the unbrinomycin antibiotics, the aqueous suspension is adjusted to pH 7.0, and is then extracted with chloroform. The organic phase is then dried with anhydrous $Na_2SO_4$ and concentrated to a small volume. The concentrate is diluted with eight to ten volumes of acetone. The acetone soluble phase is concentrated to a small volume and diluted with ten volumes of n-hexane. The resulting precipitate is collected by centrifugation, washed with hexane and dried. Purification is effected by chromatography on silica gel followed by rechromatography on acid-washed alumina. The purified material so obtained is a mixture of two isomeric anti-biotics, umbrinomycin A and unbrinomycin B, which are then resolved by gradient elution chromatography on acid-washed alumina.

To recover the diumycin antibiotics, the aqueous suspension, preferably at pH 8, is extracted with butanol. Umbrinomycin is extracted into the butanol, leaving the diumycin behind in the aqueous layer. The layers are separated, and the butanol layer containing the umbrinomycin is worked up separately. The aqueous layer containing the diumycin is adjusted to pH 3 with concentrated hydrochloric acid and extracted with water-saturated n-butanol. The butanol layer is back extracted with water at pH 7 and the aqueous extracts concentrated in vacuo to dryness. The residue is dissolved in methanol and the methanol insoluble material removed by filtration. The methanolic solution is diluted with acetone to yield a precipitate of the crude diumycin antibiotic which is dried and then further purified by a combination of Sephadex column chromatography, silica gel chromatography and countercurrent distribution; or, alternatively, by a combination of Sephadex chromatography, silica gel chromatography, and Avicel partition chromatography. Countercurrent-distribution or partition paper chromatography may be used to resolve the diumycin complex into diumycin A and B.

It has now been found that if this general procedure of recovering the diumycin-antibiotics is followed, two additional antibiotics are found. These new antibiotics are named herein diumycin A' and diumycin B' and may be separated from the diumycins A and B obtained in high purity by:

1. Repeated countercurrent distributions or
2. A combination of countercurrent distribution and silica gel chromatography.

Figure 2:
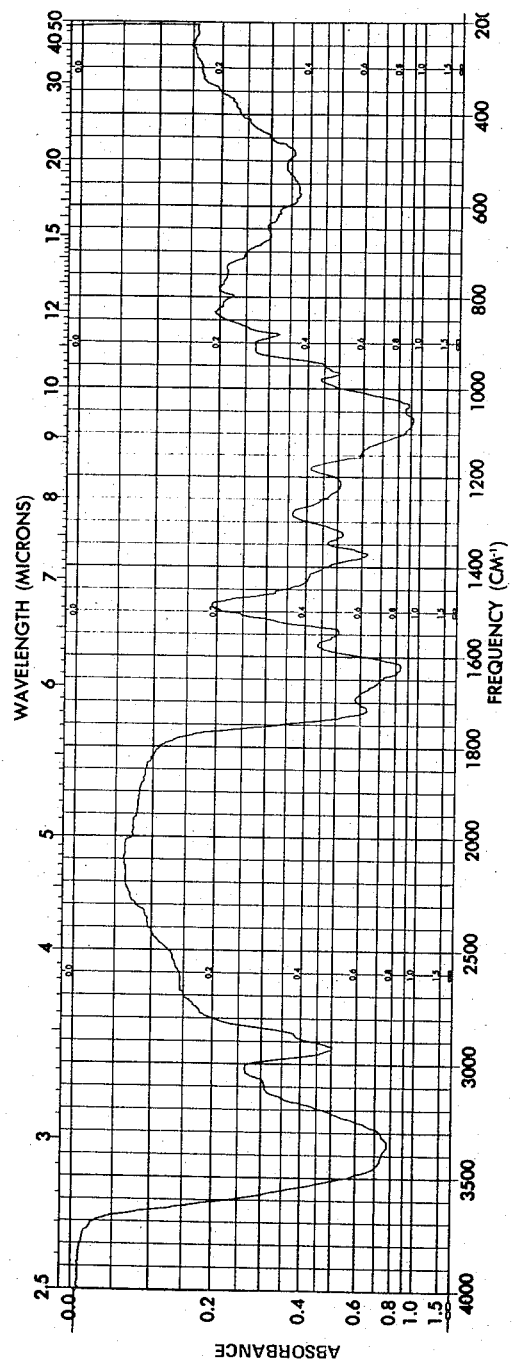
Figure 3:
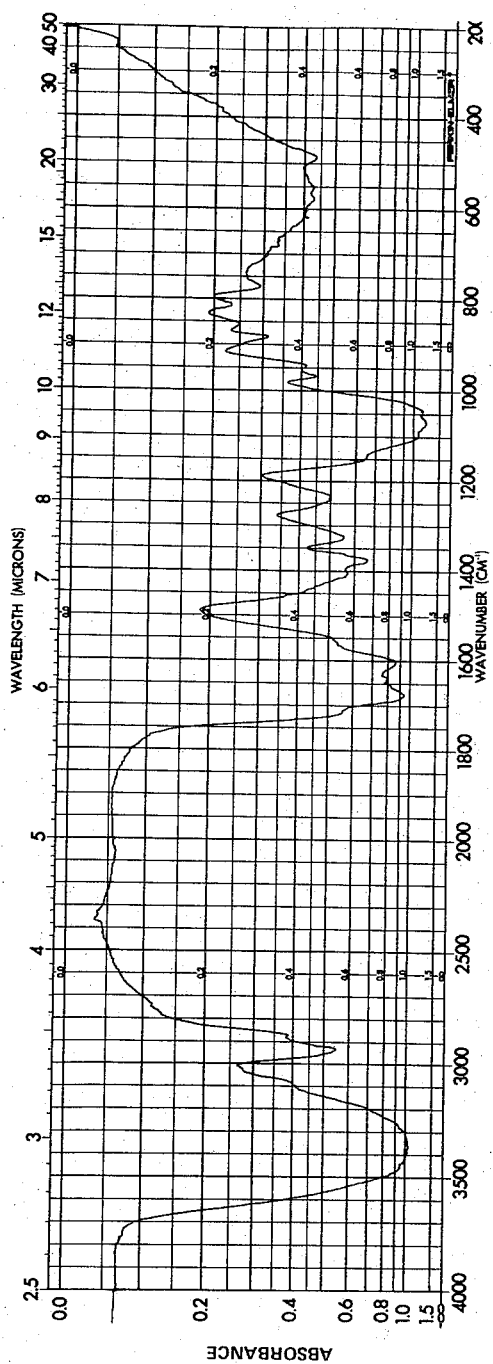

FIG. 1 shows the infrared spectrum of diumycin A', sodium salt, in KBr.
FIG. 2 shows the infrared spectrum of diumycin A', as the free acid, in KBr.
FIG. 3 shows the infrared spectrum of diumycin B', sodium salt, in KBr.
FIG. 4 shows the infrared spectrum of diumycin B', as the free acid, in KBr.

Diumycin A' and diumycin B' are equally active against gram-positive bacteria (e.g., Staphylococcus aureus) as diumycin A, diumycin B, or the diumycin mixture. These antibiotics individually, a physiologically acceptable salt thereof or mixtures may therefore be used as antimicrobial agents either as environmental disinfectants, e.g., in a spray or dust containing up to about 1% of the substance in a conventional carrier, or to combat infections in various animal species, mice, rats, etc., for example, due to Staphylococcus aureus or other gram-positive bacteria, e.g., topically in a conventional cream or ointment containing up to about 1% of the substance or in an injectable dosage form up to about 50 to 250 mg./kg./day.

Moreover, these antibiotics, particularly in the forms obtained as described in Examples 4 and 5 below, have growth promoting properties when fed to animals such as poultry (e.g., chickens and turkeys) pigs and other farm animals. For this purpose they are mixed with the feedstuff of the animal in a concentration in the range of about 0.5 to about 100 g. per ton of final feed.

The physical and chemical properties of diumycin A' are set out below.

Physical and Chemical Properties of Diumycin A'

Color: Colorless (white)
Melting point (acid): 165–170° with decomposition
Elementary analysis (sodium salt, hydrated): C, 43.38; H, 6.25; N, 3.99; P, 1.69; $H_2O$ of hydration, 7.3.
Specific optical rotation: $[\alpha]_D$ +13° (sodium salt in water)
Solubility: Soluble in water, lower alkanols, pyridine and acetic acid. Sparingly soluble or insoluble in acetone, chloroform and benzene.
Ultraviolet spectrum:

$$\lambda_{max.}^{H_2O} \ 257 \ m\mu \ (E^{1\%}=129);$$

$$\lambda_{max.}^{0.1N \ HCl} \ 246 \ m\mu \ (E^{1\%}=81)$$

$$\lambda_{max.}^{0.1N \ NaOH} \ 257 \ m\mu \ (E^{1\%}=126)$$

IR spectrum: Spectra of sodium salt and free acid of diumycin A' are reproduced in FIGS. 1 and 2, respectively.
Neutralization equivalent by potentiometric titration: 512
Distribution coefficient of diumycin A', n-propanol, n-butanol, 0.5 N ammonia (2:3:4 by volume): 0.21

Distribution coefficient of diumycin A in the same system is 0.18.

Paper chromatography in the system n-butanol:acetic acid:$H_2O$ (12:3:5) and pyridine:n-butanol:$H_2O$ (4:6:3) shows no glucose in the acid hydrolysate (2N HCl, 100°, 2.5 hours, sealed tube) of diumycin A'. When diumycin A is examined under these conditions, glucose is found.

The physical and chemical properties of diumycin B' are set out below.

Physical and Chemical Properties of Diumycin B'

Color: Colorless (white)
Melting point (acid): About 170° with decomposition
Elementary analysis (sodium salt, hydrated): C, 43.06; H, 6.17; N, 4.23; P, 1.62; $H_2O$ of hydration, 10.1
Specific optical rotation: $[\alpha]_D$ +13° (sodium salt in water)
Solubility: Soluble in water, lower alkanols, pyridine and acetic acid. Sparingly soluble or insoluble in acetone, chloroform and benzene.
Ultraviolet spectrum: Diumycin B' has no ultraviolet absorption maximum between 220 and 300 m$\mu$.
IR Spectrum: Spectra of sodium salt and free acid of diumycin B' are reproduced in FIGS. 3 and 4, respectively.
Neutralization equivalent by potentiometric titration: 612.
Distribution coefficient of diumycin B' in n-propanol, n-butanol, 0.5N ammonia (2:3:4 by volume): 0.40.
Distribution coefficient of diumycin B in the same system is 0.30.

Paper chromatography in the systems n-butanol:acetic acid:$H_2O$ (12:3:5) and pyridine:n-butanol:$H_2O$ (4:6:3) shows no glucose in the acid hydrolysate (2N HCl, 100°, 2.5 hours, sealed tube) of diumycin B'. When diumycin B is examined under these conditions, glucose is found.

Diumycin A' and diumycin B' are acids that form salts with bases. These salts can be formed by interacting with diumycin A' or B' with a base, such as an inorganic base, e.g., ammonium hydroxide, an alkali metal hydroxide, such as sodium hydroxide and potassium hydroxide, and an alkaline earth metal hydroxide, such as calcium hydroxide, barium hydroxide and magnesium hydroxide, and an organic base, such as a primary, secondary and tertiary amines, e.g., a (lower alkyl)amine such as methylamine, a di(lower alkyl)amine, such as diethylamine, a tri(lower alkyl)amine, such as triethylamine, a (hydroxy-lower alkyl)amine, such as ethanolamine, and so forth.

The following Examples further illustrate the invention:

EXAMPLE 1

Isolation of diumycin A, diumycin A', diumycin B, and diumycin B'

(a) *Fermentation*—The fermentation of *Streptomyces umbrinus* ATCC 15972 is carried out as described in Examples 2, 3 and 10 to 14 of U.S. Patent No. 3,496,268.

(b) *Isolation of Diumycin A*—Diumycin mixture (6.00 g. ammonium salt) is subjected to 1000 transfers under nitrogen in a countercurrent apparatus in the system n-propanol, n-butanol, 0.5N ammonia (2:3:4 by volume). Tubes 150 to 215 are combined, concentrated *in vacuo* to a dry residue, and subjected to 1000 transfers in a second countercurrent distribution under nitrogen in the system above. Tubes 175–230 (K=0.24) are combined and concentrated *in vacuo* to a residue that is taken up in 2N ammonia. Addition of n-propanol and removal of the solvent *in vacuo* gives 1.23 g. of ammonium salt of diumycin A as a white powder.

(c) *Isolation of Diumycin B and B'*—Tubes 261 to 300 from the initial 6.00 g. countercurrent distribution are combined, concentrated *in vacuo* to a dry residue, and subjected to 850 transfers in another countercurrent distribution under nitrogen in the system above. Tubes 180–200 (K=0.30) are combined and concentrated *in vacuo* to a residue that is taken up in 2N ammonia. Addition of n-propanol and removal of the solvent *in vacuo* gives 266 mg. ammonium salt of diumycin B as a white powder. Tubes 241–270 (K=0.4) on similar workup give 116 mg. ammonium salt of diumycin B' as a white powder.

(d) *Isolation of Diumycin A'*—Tubes 216 to 260 from the initial 6.00 g. countercurrent distribution are combined, concentrated *in vacuo* to a residue, and subjected to another 1000 transfer countercurrent distribution. Tubes 151 to 180 are combined, concentrated *in vacuo* to a residue, and chromatographed on a silica gel column (100–200 mesh, 2.5 x 80 cm.) in the system n-propanol, 2N ammonia (8:2 by volume). Fractions of 15 ml are collected. Tubes 30–63 are combined and evaporated *in vacuo* to give 193 mg. ammonium salt of diumycin A' as a white powder.

EXAMPLE 2

Isolation of diumycin A, diumycin A', diumycin B, and diumycin B'

(a) *Isolation of Diumycin A'*—Diumycin mixture (6.00 g. ammonium salt) (prepared as described in Example 1) is subjected to 850 transfers under nitrogen in a countercurrent apparatus in n-propanol, n-butanol, 0.5N ammonia (2:3:4 by volume). Tubes 161 to 200 are combined, concentrated *in vacuo* to a residue, and subjected to 1000 transfers in a second countercurrent distribution under nitrogen in the system above. Tubes 175 to 220 are combined and concentrated under vacuum to a residue. The residue is absorbed on silica gel, applied to the top of a silica gel column (100–200 mesh, 2.5 x 80 cm.), and chromatographed with n-propanol, 2N ammonia (8:2 by volume). Fractions of 15 ml. are collected. Tubes 36–52 are combined and concentrated under vacuum to 130 mg. ammonium salt of diumycin A' as a white powder.

(b) *Isolation of Diumycin A*—Tubes 150 to 174 from the 1000 transfer countercurrent distribution above are combined and concentrated *in vacuo* to a residue that is absorbed on silica gel, applied to the top of a silica gel column, and chromatographed in n-propanol, 2N ammonia (8:2 by volume). Fractions of 15 ml. are collected. Tubes 40 to 60 are combined and concentrated *in vacuo* to 138 mg. ammonium salt of diumycin A as a white powder.

(c) *Isolation of Diumycin B and Diumycin B'*—Tubes 220 to 250 from the initial 850 transfer countercurrent distribution of 6.00 g diumycins above are combined and concentrated under vacuum to a residue. The residue is absorbed on silica gel, applied to the top of a silica gel column (100–200 mesh, 2.5 x 80 cm.), and chromatographed in n-propanol, 2N ammonia (8:2 by volume). Fractions of 15 ml. are collected. Tubes 37-47 are combined and concentrated *in vacuo* to 57 mg. ammonium salt of diumycin B' as a white powder. Tubes 90–110 on similar workup give 138 mg. ammonium salt of diumycin B as a white powder.

EXAMPLE 3

Isolation of diumycin A and diumycin A'

Diumycin mixture (6.00 g., ammonium salt) prepared as described in Example 1 is subjected to 1965 transfers under nitrogen in a countercurrent apparatus in n-propanol, n-butanol, 0.5N ammonia (2:3:4 by volume). Tubes 260 to 297 are combined and concentrated *in vacuo* to a residue. The residue is taken up in 2N ammonia. n-Propanol is added and the solvent is evaporated *in vacuo* to give 2.25 g ammonium salt of diumycin A as a white powder. Tubes 321 to 410 on similar workup give 0.91 g. ammonium salt of diumycin A' as a white powder, while tubes 298–320, similarly, yield 1.23 g. mixture of ammonium salts of diumycin A and diumycin A'.

EXAMPLE 4

Free acid of diumycin A' and diumycin B'

Diumycin A' (200 mg., ammonium salt) is dissolved in water and treated with the ion exchange resin Dowex 50 (H+ form). The resin is filtered off using methanol to prevent foaming. n-Propanol is added and the solvent is removed under vacuum to give 163 mg. free acid of diumycin A' as a white powder.

Diumycin B' (free acid) is obtained from the ammonium salt of diumycin B' by the same treatment used for the conversion of the ammonium salt of diumycin A' to the free acid.

EXAMPLE 5

Salts of diumycin A' and diumycin B'

The free acid of either diumycin A' or diumycin B' is dissolved in water (30 mg./ml.) and the solution is adjusted to pH 8 using 1N sodium hydroxide and lyophilized. The residue is dissolved in water, and ethanol is added to precipitate the sodium salt which is filtered off and dried.

Similarly, equivalent amounts of potassium hydroxide, barium hydroxide, or organic bases such as dimethylamine can be substituted for sodium hydroxide to give the respective salts of either diumycin A' and diumycin B'.

What is claimed is:

1. An antibiotic effective in inhibiting the growth of gram-positive bacteria, selected from the group consisting of diumycin A', diumycin B' and physiologically acceptable salts of diumycin A' and diumycin B', said diumycin A' being a colorless phosphorus-containing acid, having a melting point (acid) of 165–170° with decomposition, an elementary analysis (sodium salt, hydrated): C, 43.38; H, 6.25; N, 3.99; P, 1.69; $H_2O$ of hydration, 7.3, a specific optical rotation of $[\alpha]_D$ +13° (sodium salt in water), is soluble in water, lower alkanols, pyridine and acetic acid; is sparingly soluble or insoluble in acetone, chloroform and benzene; has an ultraviolet spectrum of $\lambda_{max.}^{H_2O}$ 257 m$\mu$ ($E^{1\%}$=129)

$\lambda_{max.}^{0.1N\ HCl}$ 246 m$\mu$ ($E^{1\%}$=81)

$\lambda_{max.}^{0.1N\ NaOH}$ 257 m$\mu$ ($E^{1\%}$=126);

has an infrared spectrum as the free acid as shown in FIG. 2 and the sodium salt has an infrared spectrum as shown in FIG. 1, has a neutralization equivalent by potentiometric titration: 512; and has a distribution coefficient of 0.21 in the system, n-propanol, n-butanol, 0.5 N ammonia (2:3:4 by volume); said diumycin B' being a colorless phosphorus-containing acid having a melting point (acid) of about 170° with decomposition, an elementary analysis (sodium salt, hydrated): C, 43.06; H, 6.17; N, 4.23; P, 1.62; $H_2O$ of hydration, 10.1; a specific optical rotation: $[\alpha]_D$ +13° (sodium salt in water); is soluble in water, lower alkanols, pyridine and acetic acid; is sparingly soluble or insoluble in acetone, chloroform and benzene; has no ultraviolet absorption maximum between 220 and 300 m$\mu$; has an infrared spectrum as the free acid as shown in FIG. 4 and the sodium salt has an infrared spectrum as shown in FIG. 3; has a neutralization equivalent by potentiometric titration: 612; and has a distribution coefficient of 0.40 in the system n-propanol, n-butanol, 0.5N ammonia (2:3:4: by volume).

2. Diumycin A' as defined in Claim 1.
3. Diumycin B' as defined in Claim 1.
4. The sodium salt of diumycin A' as defined in Claim 1.
5. The sodium salt of diumycin B' as defined in Claim 1.

References Cited

UNITED STATES PATENTS 3,496,268    2/1970    Meyers _____ 424—122

JEROME D. GOLDBERG, Primary Examiner